United States Patent Office 3,481,917
Patented Dec. 2, 1969

3,481,917
N - MERCAPTOSUCCINOYLINSULIN AND N - (LOWER)ALKANOYLMERCAPTO-SUCCINOYLINSULIN
Norman H. Grant, Wynnewood, Harvey E. Alburn, West Chester, and Richard L. Fenichel, Wyncote, Pa., assignors to American Home Products Corporation, New York, N.Y., a corporation of Delaware
No Drawing. Filed Mar. 6, 1967, Ser. No. 620,657
Int. Cl. C07g 15/00; A61k 17/02
U.S. Cl. 260—112.7        4 Claims

ABSTRACT OF THE DISCLOSURE

Novel mercaptosuccinoyl-insulin and S-lower(alkanoyl)derivatives thereof are prepared by treating insulin with S-(lower)alkanoylmercaptosuccinic anhydride and, if required, removing the (lower)alkanoyl groups with a mild nucleophilic agent, such as hydroxylamine or imidazole. The new compounds have hypoglycemic activity and are useful to treat diabetes.

---

This invention relates to derivatives of insulin, which have therapeutic utility. More particularly, it relates to (lower) alkanoylmercaptosuccinoylinsulin and mercaptosuccinoylinsulin with blood sugar lowering activity.

BACKGROUND OF THE INVENTION

The use of insulin as an agent to lower blood sugar and control diabetes is a matter of common knowledge and experience. However, insulin itself is unstable and dosage forms containing it must be kept under refrigeration and stabilized by the addition of materials which can cause adverse side reactions in some susceptible individuals. Furthermore, insulin has a rather short duration of action, of only about six to eight hours, requiring multiple administration during the day. The insulin hormone has been modified by forming derivatives thereof, such as zinc complexes, protamine zinc complexes, and the like; and these do indeed provide longer durations of activity, but they are difficult to manufacture because particle size controls the duration of activity, and difficult to use, because it is essential to disperse the active material before administration. Thus a need exists for forms of insulin which are highly effective as hypoglycemic agents in the treatment of diabetes; which have long durations of activity coupled with quick onsets of action; and which are well-tolerated by the patient. Such compounds are now provided by this invention.

DESCRIPTION OF THE INVENTION

The compounds of this invention are, in essence: a compound selected from mercaptosuccinoylinsulin and S(lower)-alkanoyl derivatives thereof, said (lower)-alkanoyl group containing from about 2 to about 6 carbon atoms. Special mention is made of two important embodiments of the instant invention with particularly useful hypoglycemic activity. These are, respectively, mercaptosuccinoylinsulin and S-acetylmercaptosuccinoylinsulin.

The term "(lower)alkanoyl" when used herein and in the appended claims contemplates alkanoyl groups containing from about 2 to about 6 carbon atoms in straight- or branched chain configurations. Illustrative of these, for example, are acetyl, n-propionyl, n-butyroyl, n-pentanoyl, 2-ethylpropionyl, n-hexanoyl, 2,3-dimethylbutyroyl, and the like.

The new S-(lower)alkanoylmercaptosuccinoyl derivatives (I) of insulin are prepared by the following reaction:

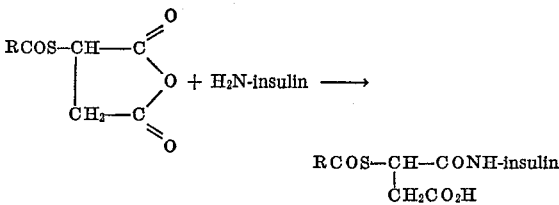

wherein R is (lower)alkyl.

The new mercaptosuccinoylinsulin is made by dealkanoylating the compound of Formula I with a mild nucleophile in the presence of water according to the following sequence:

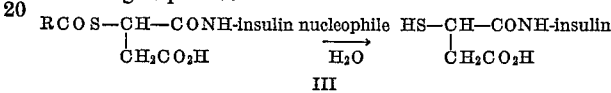

wherein the mild nucleophilic agent may, for example, be hydroxylamine, imidazole, or an obvious chemical equivalent thereof.

The compounds of this invention are those wherein all of the free amino groups in insulin have been substantially completely substituted by reaction with a reagent forming the mercaptosuccinoyl group.

The conditions required for converting compounds of Formula II to those of Formula I are not particularly critical. Thus, for example, it is convenient to use from about one-fifth to one-half parts by weight of (lower)alkanoylmercaptosuccinic anhydride per part by weight of insulin (this provides a stoichiometric excess of acylating agent). The reaction occurs smoothyl and completely at a pH of from about 7.5 to 8.5 in 0.1 M potassium phosphate buffer and even at 0° C., preferably in a nitrogen atmosphere. While the acylating agent can be added all at once, initially, it is preferred to add it portionwide, at intervals of about 15 minutes, until all has been added. The product is isolated by adjusting the pH to about 8.6–9.2, dialyzing the reaction mixture against distilled water and freeze drying (lyophilizing) the retentate.

Conversion of the S-(lower)alkanoylmercaptosuccinoylinsulin (I) to mercaptosuccinoylinsulin (III) is accomplished by treating an aqueous suspension with an excess of a mild, nucleophilic reagent such as hydroxylamine at pH of about 8.5 until replacement of the (lower)-alkanoyl groups by hydrogen is substantially complete. The product (III) is recovered by dialyzing the reaction mixture, then lyophilizing the retentate.

The instant compounds can be administered in a variety of injectable dosage forms. As with insulin, the route of administration determines the duration and rapidity of action. Patients are taught to give themselves injections aseptically by the subcutaneous route, but in coma intravenous or intramuscular injections would be employed by the physician to insure rapid action. A convenient site of subcutaneous administration is the thigh.

The daily dose requirements vary with the particular composition being employed, the severity of the symptons being presented, and the animal or human being treated. In humans, as with animals, the dosage also varies with the size of the patient. Dosage is calculated on a unit basis in the same way as the dosage of crystalline zinc insulin. With adults of about 70 kilograms, the ordinarily effective dose is from about 1 to about 200 units per day. "Units" are U.S.P. Insulin Units. Of course, as in the case of insulin, each patient requires individual study by the physician to determine the most efficacious time, number, and amount of individual daily doses. As with insulin, blood sugar and urine sugar estimations provide a guide for therapy with the instant compositions, the therapeutic objective being to lower the blood sugar level to normal and then to maintain it.

For dosages the instant complexes are compounded into a variety of largely aqueous injectable dosage forms containing various electrolytes, buffers, stabilizers and the like. Thus, for example, the aqueous suspension of the instant compounds can contain sodium chloride, sodium acetate, methyl para-hydroxybenzoate, glycerin, dibasic sodium phosphate, small, stabilizing amounts of phenol, meta-cresol and the like. An especially useful unit dosage form comprises 20, 40 or 80 units/ml. in sterile physiological saline.

Since the instant derivatives of insulin are chemically unique, in that their free amino groups, which are usually positively charged, are replaced by residues containing free carboxyl groups, which can be negatively charged, they offer many advantages in the formulation of new and useful dosage forms. Mention is made, for example, of salts with inorganic and organic bases, providing desirable now solubility properties.

Another object in the use of the new derivatives of Formulae I and III is to provide an improved means to control diabetes in patients who are not readily maintained on regular doses of present forms of insulin. Some patients develop what appears to be an insulin resistance. This is overcome by administration of unusually high doses of the present types of insulin. The resistance appears to result from the development of antibodies. The instant derivatives, which are chemically and immuologically different from the present types of insulin, are not inactivated by the developed antibodies and, if they are administered, there is no cause for the resistance to arise.

DESCRIPTION OF THE PREFERRED EMBODIMENTS

The following examples are intended to describe new compounds within the scope of this invention and means to obtain them. They are merely illustrative and are not to be construed to limit the claims in any maner whatsoever.

Example 1

S-acetylmercaptosuccinoylinsulin.—A solution is prepared containing 700 mg. of insulin in 0.1 M potassium phosphate buffer, pH 7.5. At 15 minutes intervals 25 mg. aliquots of S-acetylmercaptosuccinic anhydride reagent are added up to a total of 100 mg. The entire reaction is carried out under nitrogen at 0°. After one hour, the pH is adjusted to 9.2 (to bring the insulin into solution) and then to 8.6. Two 25 mg. quantities of reagent are added at 15 minute intervals. Fifteen minutes after the last addition the solution is dialyzed against distilled water. The insoluble component of the retentate is removed by filtration and dried, yielding 133 mg., and the filtrate was lyophilized, yielding 450 mg.

Example 2

The procedure of Example 1 is repeated, substituting stoichiometrically-equivalent quantities of S-n-propionylmercaptosuccinic anhydride; n-butyroylmercaptosuccinic anhydride, n-pentanoylmercaptosuccinic anhydride; 2-ethylpropionylmercaptosuccinic anhydride; n-hexanoylmercaptosuccinic anhydride, and 2,3-dimethylbutyroylmercaptosuccinic anhydride.

There are obtained, respectively, the following (lower)-alkanoylmercaptosuccinoylinsulins:
S-(n-propionyl)mercaptosuccinoylinsulin;
S-(n-butyroyl)mercaptosuccinoylinsulin;
S-(n-pentanoyl)mercaptosuccinoylinsulin;
S-(2-ethylpropionyl)mercaptosuccinoylinsulin;
S-(n-hexanoyl)mercaptosuccinoylinsulin; and
S-(2,3-dimenthylbutyroyl)mercaptosuccinoylinsulin.

Example 3

Mercaptosuccinoylinsulin.—A mixture is prepared containing 250 mg. of insulin suspended at 0° C. in 50 ml. of 0.1 M potassium phosphate pH 8.3. Twenty-five mg. of S-acetylmercaptosuccinic anhydride reagent is added, the pH is adjusted to 7.5, and an additional 25 mg. of reagent is added. After 2 more 25 mg. aliquots are added, the mixture is stirred for 15 minutes, dialyzed overnight, and the retentate is lyophilized. One hundred mg. is stirred with 20 ml. of hydroxylamine reagent (0.25 $NH_2OH \cdot HCl$, 0.16% NaOH, 0.125% potassium acetate) at 2° C. for 1 hour. The system is then dialyzed and the retentate lyophilized.

Example 4

Mercaptosuccinoylinsulin.—A mixture consisting of 500 mg. of insulin, 100 ml. of phosphate buffer (pH 8.5), and 30 mg. of S-acetylmercaptosuccinic anhydride reagent is stirred for 15 minutes. Three additional aliquots of 30 mg. of reagent are added at 15 minute intervals. Then an excess of neutral hydroxylamine reagent is added. After 15 minutes of stirring the suspension is dialyzed and finally is lyophilized, leaving the product as a residue.

Example 5

S-acetylmercaptosuccinoylinsulin.—A mixture of 100 mg. of insulin (25.3 units per mg.), 50 ml. of 0.1 M potassium phosphate buffer, pH 7.5, and 12 mg. of S-acetylmercaptosuccinic anhydride reagent is stirred for 15 minutes. Four additional samples of reagent are added at 15 minute intervals, and the solution is then dialyzed against cold distilled water. The retentate is lyophilized, giving 120 mg. of product as a residue.

In the preliminary evaluation of the hypoglycemic compounds of this invention, and as proof of their valuable activity, the in vitro and in vivo effects of the instant compounds were tested as follows:

The concentration dependent mitochondrial swelling activity of acylmercaptosuccinoyl insulin and mercaptosuccinoyl insulin was used as an index of their activity. Richard L. Finichel, William H. Bechmann, and Harvey E. Alburn, Biochestry, 5, 461–466 (1966).

Rat liver miltochondria were prepared in 0.25 M sucrose solution containing 0.001 M ethylenediamine tetraacetic acid according to a standardized differential centrifugation procedure. The effect of these insulins on mitochondrial swelling of freshly isolated rat liver mitochondria suspended in 0.125 M KCl—0.02 M tris (hydroxymethylaminomethane)-0.1% partially hydrolyzed gelatin solution at pH 7.3 was measured by following changes in light absorption at 520 m$\mu$ with a Beckman Model B Spectrophotometer. The results are summarized in Table I.

TABLE I.—MITOCHONDRIAL SWELLING ACTIVITY OF ACETYLMERCAPTOSUCCINOYL INSULIN AND MERCAPTOSUCCINOYLINSULIN

A. Concentration, $1 \times 10^{-5}$ M

|  | $\Delta$ O.D. spon. at 520 m$\mu \times 10^3$ | | | |
| --- | --- | --- | --- | --- |
|  | 10' | 20' | 30' | Total |
| Acetylmercaptosuccinoylinsulin | 132 | 138 | 62 | 332 |
| Mercaptosuccinoylinsulin | 126 | 149 | 80 | 355 |

B. Concentration, $5 \times 10^{-6}$ M

|  | $\Delta$ O.D. spon. at 520 m$\mu \times 10^3$ | | | |
| --- | --- | --- | --- | --- |
|  | 10' | 20' | 30' | Total |
| Acetylmercaptosuccinoylinsulin | 111 | 123 | 65 | 286 |
| Mercaptosuccinoylinsulin | 86 | 133 | 67 | 299 |

TABLE I.—Continued

C. Concentration, 2.5×10⁻⁶ M

| | Δ O.D. spon. at 520 mμ×10³ | | | |
|---|---|---|---|---|
| | 10′ | 20′ | 30′ | Total |
| Acetylmercaptosuccinoylinsulin | 37 | 5 | 9 | 51 |
| Mercaptosuccinoylinsulin | 26 | 6 | 14 | 46 |

D. Concentration, 1.25×10⁻⁶ M

| | Δ O.D. spon. at 520 mμ×10³ | | | |
|---|---|---|---|---|
| Acetylmercaptosuccinoylinsulin | 34 | 10 | 7 | 51 |
| Mercaptosuccinoylinsulin | 10 | −1 | 8 | 17 |

Table I shows the mitochrondrial swelling observed with these insulins. Both the acylmercaptosuccinoyl insulin and the mercaptosuccinoyl insulin show good and equivalent concentration dependent activity.

In vivo testing of acylmercaptosuccinoyl insulin and mercaptosuccinoyl insulin was done as follows:

After obtaining an initial 0.1 ml. blood sample from the hearts of lightly etherized male Sprague Dawley rats, after fasting for 18 hours, for blood sugar analysis, they received by injection into the leg vein different concentrations as units/200 g. of rat of either acylmercaptosuccinoyl insulin, or mercaptosuccinoyl insulin. Additional 0.1 ml. blood samples were obtained from the hearts of these animals at regular time intervals for blood sugar analysis. Blood sugar levels of 65–70 m. percent of glucose in the untreated animals decreased to 25–35 mg. percent in 30 minutes after treatment and did not rise above about 42 mg. percent even after 180 minutes from treatment with 1 unit/animal (about 5 unit/kg.). Both acylmercaptosuccinoyl insulin and mercaptosuccinoyl insulin lowered blood sugar significantly on a dose response basis. A further evaluation of the hypoglycemic activity of mercaptosuccinoyl insulin at 1 unit/animal and 2 unit/animal showed a highly active dose response effect.

What is claimed is:

1. A compound of the formula

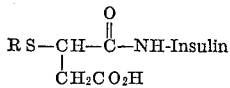

wherein R is a member of the group consisting of hydrogen and lower alkanoyl and NH represents the residue of a free amino group of insulin and wherein substantially all of the free amino groups of insulin are substituted by

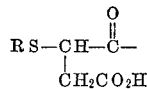

2. The compound of claim 1 where R is lower alkanoyl.
3. The compound of claim 2 werein lower alkanoyl is acetyl.
4. The compound of claim 1 wherein R is hydrogen.

References Cited

FOREIGN PATENTS 614,990  12/1948  Great Britain.

OTHER REFERENCES

Tietzl et al., Biochem. Biophys. Acta 59, 336–346 (1962).

Camin-Glabicani et al., Compt Rend. Soc. Biol. (Paris) 158, 790–793 (1954).

Freudenberg et al., cited in Chem Abst. 22, 2206–2207 (1928).

Stracher et al., Biochim. Biophys. Acta 20, 595–596 (1956).

Stracher et al., J. Am. Chem. Soc. 81, 1432–1435 (1959).

Virupaksha et al., Biochem. (Wash.) 3, 1507–1511 (1964).

LEWIS GOTTS, Primary Examiner

M. M. KASSENOFF, Assistant Examiner

U.S. Cl. X.R.

424—178